US006827084B2

(12) United States Patent
Grubb, Jr.

(10) Patent No.: US 6,827,084 B2
(45) Date of Patent: Dec. 7, 2004

(54) AUTOMATIC GAS BLENDER

(76) Inventor: Lloyd Thomas Grubb, Jr., 230 Clay Hill Rd., Sneads Ferry, NC (US) 28460

(*) Notice: Subject to any disclaimer, the term of this patent is extended or adjusted under 35 U.S.C. 154(b) by 0 days.

(21) Appl. No.: 10/176,767

(22) Filed: Jun. 21, 2002

(65) Prior Publication Data

US 2003/0234019 A1 Dec. 25, 2003

(51) Int. Cl.[7] ................................................ F16K 31/02

(52) U.S. Cl. ............................. 128/204.22; 128/205.11; 128/204.21

(58) Field of Search ....................... 128/200.24, 201.21, 128/201.27, 201.28, 204.18, 204.21, 204.22, 204.26, 205.11, 205.18, 205.22, 205.24, 898; 141/4, 9, 10, 39, 103, 9.1, 104; 137/888, 892, 896, 897; 95/8, 12, 14, 23, 45–56; 366/17, 18, 107

(56) References Cited

U.S. PATENT DOCUMENTS 3,593,735 A * 7/1971 Reiher ......................... 137/88
4,860,803 A 8/1989 Wells
5,396,935 A 3/1995 Schergerin
5,404,921 A * 4/1995 Lamoreaux et al. .......... 141/97
5,513,678 A * 5/1996 Schultz et al. ................. 141/4
5,699,790 A 12/1997 Bathe et al.
5,794,616 A * 8/1998 Cochran et al. ....... 128/205.11
5,858,064 A * 1/1999 Delp, II ......................... 95/12
5,901,758 A * 5/1999 Hwang et al. ................. 141/2
5,915,834 A 6/1999 McCulloh
5,992,464 A 11/1999 Cowell
5,992,478 A * 11/1999 Micke et al. ............... 141/196
6,079,459 A * 6/2000 Klotz et al. .................... 141/18
6,138,670 A * 10/2000 Delauze et al. ........ 128/201.27
6,152,192 A * 11/2000 Klotz et al. .................... 141/18
6,182,713 B1 * 2/2001 Deck et al. .................... 141/18
6,347,627 B1 * 2/2002 Frankie et al. ......... 128/201.21

FOREIGN PATENT DOCUMENTS

GB 2176313 A * 12/1986

* cited by examiner

*Primary Examiner*—Henry Bennett
*Assistant Examiner*—Teena Mitchell
(74) *Attorney, Agent, or Firm*—Jenkins, Wilson & Taylor, P.A.

(57) ABSTRACT

A system and method for automatically blending gases, comprising an input device for receiving predetermined mixed gas concentration data from the user, a plurality of gas inlet valves which allow a plurality of gas flows to enter a homogenizing chamber for mixing the plurality of gas flows into a mixed gas, at least one gas sensor for detecting the concentration of one or more components of the mixed gas and generating at least one output signal representative thereof; and a manager for receiving the at least one output signal and comparing the at least one output signal with the predetermined mixed gas concentration data and in response generating a signal to at least one gas inlet valve to modify the plurality of gas flows to maintain the desired mixed gas concentration.

16 Claims, 6 Drawing Sheets

AUTOMATIC GAS BLENDER

TECHNICAL FIELD

The present invention relates generally to an apparatus for the production of mixed gases. More particularly, the present invention relates to an improved apparatus for mixing two or more gases to a desired gas concentration.

BACKGROUND ART

Various devices have been available for years for gas mixing purposes, such as systems to be used in mixed-gas diving. Mixed-gas diving has increased in popularity over recent years as a way to limit common injuries sustained by self-contained underwater breathing apparatus (SCUBA) diving activities. Mixed gases have also been used in surface supplied diving and re-breather diving activities. Decompression sickness, commonly referred to as the "bends" is a serious medical condition that can be experienced by divers that are exposed to elevated nitrogen levels forming in the bloodstream as the diver ascends from the increased pressure experienced at deeper depths. The nitrogen level formed in a diver's bloodstream is a direct result of the amount of nitrogen in the air stored in a diver's tanks and breathed at depth. Based on the understanding that the use of air having reduced amounts of nitrogen decreases the occurrence and seriousness of the bends in divers, the National Oceanographic and Atmospheric Association (NOAA) began experimenting with gases labeled "Nitrox" that had reduced levels of nitrogen through the use of supplemental oxygen added to ambient air (Nitrox was first used by the British military in World War II, but NOAA began the first commercial experimentation). While ambient atmospheric air typically has approximately 21% oxygen concentration at sea level and a corresponding 79% nitrogen concentration, Nitrox was primarily developed to contain 32%–36% oxygen, having correspondingly decreased levels of nitrogen. These Nitrox gases that had reduced levels of nitrogen were found to reduce the occurrence and seriousness of divers contracting the bends, while minimizing oxygen toxicity problems. Further Nitrox research resulted in Nitrox blends ranging from 21% to 100% oxygen, depending on the desired use of the mixture and the equipment involved in production of the mixture. With the raised popularity of using Nitrox for recreational and commercial diving, further research led to the development of gases known as Trimix, a mixture of helium, oxygen, and nitrogen gas, which is also used for diving. However, Nitrox is currently the gas mixture of choice for the recreational diver.

The use of Nitrox gases for diving has increased dramatically and likewise has created a great demand in recreational and commercial diving operations for the production of Nitrox gas. Various prior art devices have attempted to address the mixing of gases for Nitrox and other gas production purposes, yet these devices have various shortcomings that are overcome by the present invention.

U.S. Pat. No. 4,860,803 to Wells teaches the use of a pressure regulator to control the injection of oxygen into a stream of ambient air in order to produce an oxygen enriched air mixture. This mixture is then compressed and delivered to storage or SCUBA cylinders for use in diving or other applications. Wells discloses a purely mechanical system, with no computer or monitoring control, thus requiring an operator to continuously observe the oxygen analyzer in order to provide the control element. Additionally, the location of the oxygen analyzer at the discharge side of the compressor system results in a large lag time of several minutes between the time adjustment is made to the oxygen concentration and when the results of that adjustment can be observed, leading to concentration maintenance difficulties. Wells also requires a source of oxygen appropriate for injection into the ambient air stream thus producing the chance of explosions and other inherent problems associated with the use of oxygen.

U.S. Pat. No. 5,992,464 to Cowell discloses a pre-compression Nitrox in-line blender that uses pressure adjusted by a regulator applied across an orifice to control the amount of oxygen added to ambient air. In Cowell, an oxygen analyzer is observed by the operator in order to provide the operator with information to make adjustments to maintain the desired output concentration. Similar to Wells, there is no computer control or monitoring systems thus requiring an operator to continuously observe the oxygen analyzer in order to provide the control element. The Cowell device also has inherent accuracy and safety problems should the operator be the least inattentive.

U.S. Pat. No. 5,915,834 to McCulloh discloses an apparatus for mixing two gases by using a source of forced or pressurized air and a pressurized source of oxygen flowing through regulators in order to supply a control valve entering into a mixing plenum. The shuttling between air and oxygen and the non-proportional nature of the mixing valve apparently renders the machine incapable of supplying a flow suitable for use with a positive displacement continuous flow machine such as a compressor. Additionally, the flow valve as described in McCulloh produces inherent overheating and life cycle limitations if operated in the disclosed manner.

The apparatus of the present invention overcomes many of the problems as found in prior art gas mixing devices by incorporating an input device for receiving desired mixed gas concentration data from the user along with a plurality of gas inlets through which a plurality of gases enter a homogenizing chamber for mixing of the plurality of gases into a mixed gas. One or more gas sensors read the concentration of the mixed gas and generate an output signal representative thereof, sending the output signal to a manager that then compares the output signal with the desired gas concentration data from the user and in turn generates a gas inlet signal to modify the flow of gas to maintain the desired mixed gas concentration.

DISCLOSURE OF THE INVENTION

In accordance with the present invention, an improved automatic gas blender is provided for automatically mixing two or more gases to a desired gas concentration. The automatic gas blender has an input device for receiving predetermined mixed gas concentration data from the user, such as the level of oxygen desired in a Nitrox mixture of the preferred embodiment. The automatic gas blender further comprises a plurality of gas inlet valves which allow a plurality of gas flows, such as ambient air and oxygen in the preferred embodiment for production of Nitrox gas mixture, to enter a homogenizing chamber where the plurality of gas flows are mixed into a mixed gas through the use of a series of mixing baffles. At least one gas sensor is provided for detecting the concentration of one or more components of the mixed gas and generating at least one output signal representative thereof. A manager is also provided for receiving the at least one output signal and comparing the at least one output signal with the predetermined mixed gas concentration data and in response generating a signal to at least one gas inlet valve to modify the plurality of gas flows to maintain the predetermined mixed gas concentration. Once the predetermined gas concentration is mixed and maintained, the mixed gas exiting the automatic gas blender can be compressed and transferred to high-pressure storage tanks.

In a preferred embodiment of producing a precise mixture of Nitrox (oxygen and ambient air), the user will enter the predetermined oxygen content for the Nitrox mixture into an input device, a preferred concentration of oxygen being between 21% and 40%. A fluid stream of ambient air will then pass through an air inlet valve into the gas addition area while a fluid stream of oxygen will pass through an oxygen inlet valve into the gas addition area. The two gas streams will merge and enter the homogenizing chamber where they will mix by passing across, around, or through at least one mixing baffle. An oxygen sensor will then measure the oxygen concentration of the mixed gas and generate an output signal representative thereof that is sent to the manager. The manager will receive the output signal and compare the signal with the predetermined oxygen content as entered by the user. The manager will then generate an oxygen inlet valve signal that is sent to the oxygen inlet valve in order to modify the valve setting, thus modifying the fluid stream of oxygen entering the gas addition area. This process is repeated until the predetermined oxygen content is reached, upon which time the gas is compressed and transferred to high-pressure storage tanks.

Therefore, it is an object of the present invention to provide a system for automatically blending two or more gases.

It is another object of the present invention to provide a system and method for automatically blending two or more gases to provide a breathing gas mixture for divers that significantly extends bottom time, reduces required decompression, and provides numerous physiologic and other benefits.

Yet another object of the present invention is to provide a method for producing a gas mixture, which can be made into a breathing quality gas mixture, that safely, automatically, accurately, and rapidly combines ambient air and pure oxygen to create a final mixture of a predetermined concentration.

Some of the objects of the invention having been stated hereinabove, other objects will become evident as the description proceeds when taken in connection with the accompanying drawings as best described hereinbelow.

DETAILED DESCRIPTION OF THE INVENTION

Figure 1:
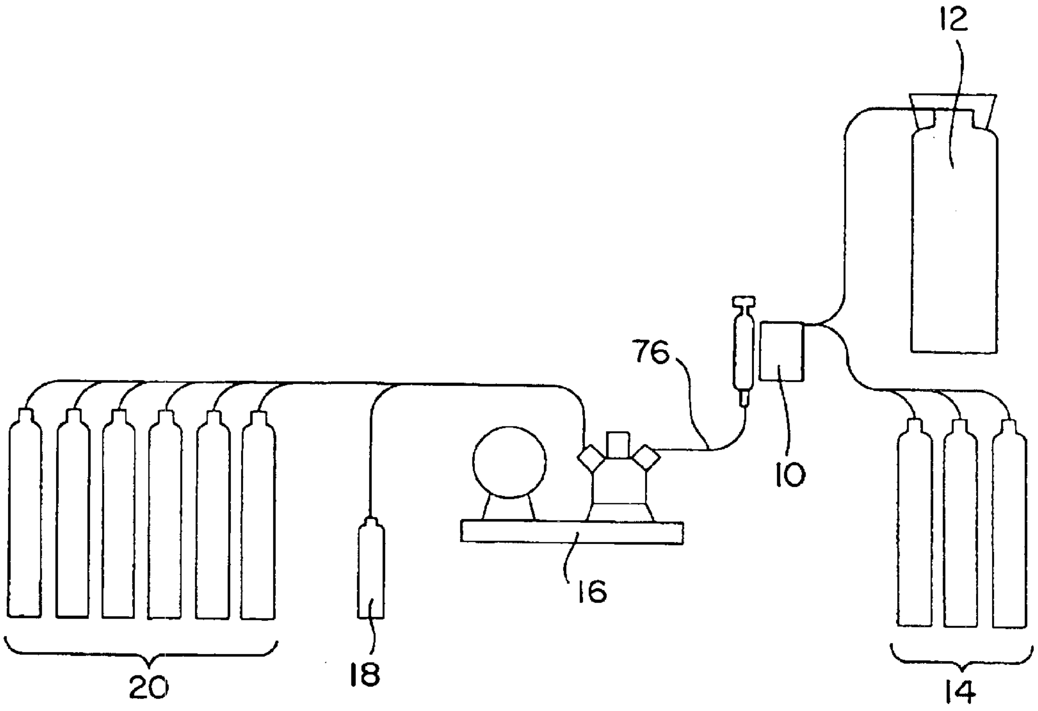
FIG. 1 is a schematic of a Nitrox filling system incorporating the automatic gas blender of the present invention.

While it is envisioned that the present invention could be used to produce Trimix gas mixtures (helium-oxygen-nitrogen gas) or other gas mixtures, in a preferred embodiment the automatic gas blender is designed to mix oxygen with ambient air to create Nitrox mixes. Nitrox blends may typically range from 21% to 100% oxygen, depending on the desired use of the mixture and the equipment involved in production of the mixture. Based upon readily available equipment for production of recreational Nitrox mixtures, the preferred embodiment discloses the production of Nitrox containing from 21% to 40% oxygen. Various terms will be used throughout this description and the following definitions can be used to describe the functionality of these terms:

Gas: The gaseous state of matter.

First Gas: The first gas used to combine with a second gas to create a combined gas; the first gas may be a pure gas or a combination of gases.

Second Gas: The second gas used to combine with the first gas to create the combined gas; the second gas may be a pure gas or a combination of gases.

Combined Gas: The combination of the first gas and the second gas.

Valve: An opening through which gas passes. Could be as simple as a hole opening or as sophisticated as mechanical, electrical, or other valves known to those skilled in the art.

Gas Addition Area: A cavity where the second gas is added to the first gas. The gas addition area can be of any shape and configuration necessary for the efficient addition of the second gas to the first gas.

Homogenizing Chamber: A cavity where the first and second gases enter after being combined and are mixed in a turbulent manner to produce a homogeneous combined gas.

Specific Gas Constituent Sensor: A device or mechanism that is uniquely sensitive to a specific gas or one of its properties and is capable of producing a signal which can be transmitted indicating the amount of the specific gas present based on a calibratable sliding scale. For example, in the preferred embodiment, an oxygen sensor will be provided that is a galvanic cell whose reaction is sensitive to oxygen content.

Manager: A computing device with multiple inputs and outputs that is capable of performing the required task according to instructions, the device can be as simple as a programmable logic controller or as sophisticated as a dedicated, specially designed computer, depending on the installed system requirements. Some, but not all, of the functions the manager can perform are: a) displaying in an appropriate manner the amount/portion of the second gas present in the combined gas; b) providing a means for the operator to instruct the manager what the amount/portion of the second gas is to be; c) determining the amount/portion of the second gas to add to the first gas to create the desired combined gas concentration; d) controlling the second gas addition valve to achieve the correct combined gas concentration; e) to communicate with other elements of the system and modify the operation of the installed system to comply with the communicated requirements; and f) inform the operator when an out of tolerance condition exists.

First Signal Conditioner: A device that conditions the signal from the Specific Gas Constituent Sensor for use by the Manager. The requirement of this device depends on the Gas Sensor and/or Manager requirements.

Second Gas Addition Valve: A valve which is infinitely variable in a proportional manner and able to maintain a position between fully open for maximum flow conditions to fully closed for a no flow condition as instructed by a signal.

Second Signal Conditioner: A device that conditions the signal from the Manager for use by the Second Gas Addition Valve. The requirement of this device depends on the Gas Addition Valve and/or Manager requirements.

Gas Sample Collector: A device design using Bernoulli's principles to retrieve a gas sample from the homogenizing chamber.

Gas Sample Return: A device design using Bernoulli's principles to return a gas sample to the homogenizing chamber.

Pumping Mechanism: A device to cause a gas to move in a certain manner. A Gas Sample Pump may be used to move the sample gas past the sensor.

Flow Meter/Regulator: A device that can measure and/or control the flow of a gas.

Nitrox: A gas mixture of air and additional oxygen.

Individual specifications for the automatic gas blender are based upon the desired end use of the gas mixture and the available equipment for production of the gas mixture. As an example, the specifications of a preferred embodiment of the automatic gas blender for the production of Nitrox gas mixture are as follows:

| | |
|---|---|
| Air Flow Rate | 0–7.5 cfm; 7.5–20 cfm; or 20–50 cfm (based on compressor system) |
| Oxygen Percentage Range | 20.9%–40% |
| Mixing Tolerance | +/- 0.5% |
| Oxygen Purity Requirement | >99.5% |
| Ambient Temperature Range | 55°–95° F. |
| Ambient Humidity Range | 20%–90% Relative Noncondensing |
| Inlet Air Temperature Range | 55°–95° F. |
| Inlet Air Humidity Range | 20%–90% Relative |
| Power Requirement | 6 amp, 115 volts +/- 10% @ 60 Hz |

As shown in FIG. 1, in a preferred embodiment of the invention for the production of Nitrox gas mixture, the automatic gas blender 10 will be located in-line between the oxygen source (liquid oxygen canisters 12, high pressure oxygen 14, and/or other oxygen source such as production of oxygen through oxidation or other chemical reactions) and the compressor 16. The automatic gas blender 10 will be mounted to a rigid structure that is not affected by vibration, such as the vibration resulting from a compressor. Ideally, this rigid structure location would be a structural wall, column, or some similar part of a building. The location chosen should be as close to the compressor intake as possible, having approximately two feet of clearance on the top, bottom, and both sides of the unit, and not be exposed to direct sunlight. Mixed Nitrox gas that exits the automatic gas blender 10 will be compressed by the compressor 16 for the filling of SCUBA tanks 18 and/or other suitable Nitrox storage containers 20.

Figure 2:
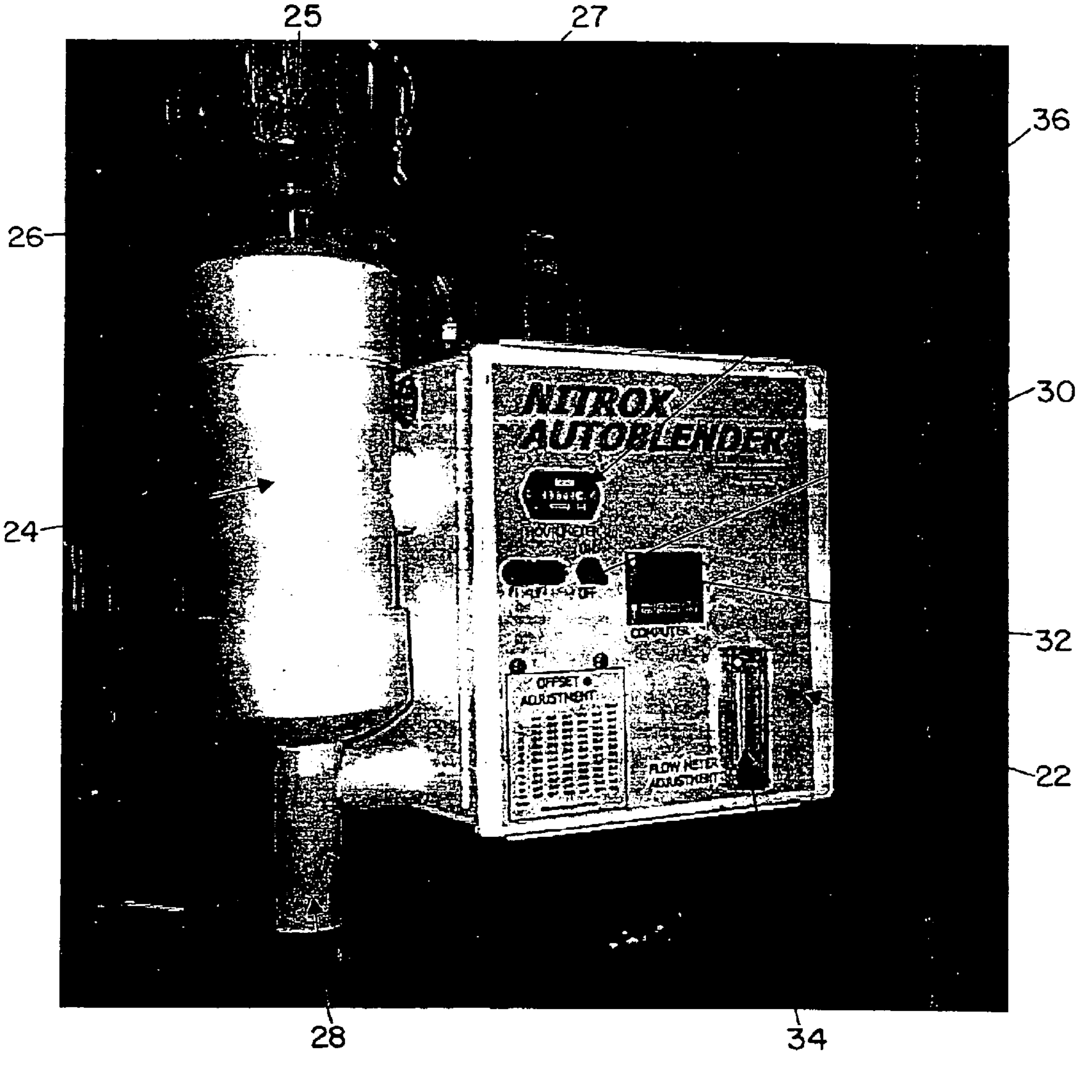
FIG. 2 is a front perspective view of the automatic gas blender of the present invention.

Referring now to FIG. 2, the exterior of the automatic gas blender 10 comprises a preferably metal casing 22 that houses the interior components of the automatic gas blender, a homogenizing chamber 24 for the mixing of the gases, an air filter 25 placed on top of the homogenizing chamber for filtering raw air, a first gas (air) inlet 26 located on top of the homogenizing chamber, a second gas (oxygen) inlet 27 located on top of the homogenizing chamber, and the mixed (combined) gas outlet 28 at the bottom of the homogenizing chamber. The operator of the system will perform various tasks from the front of the casing including activating the ON/OFF switch 30, input and data reading from the manager 32, data reading from the flow meter 34, and data reading from the hour meter 36.

Figure 3:
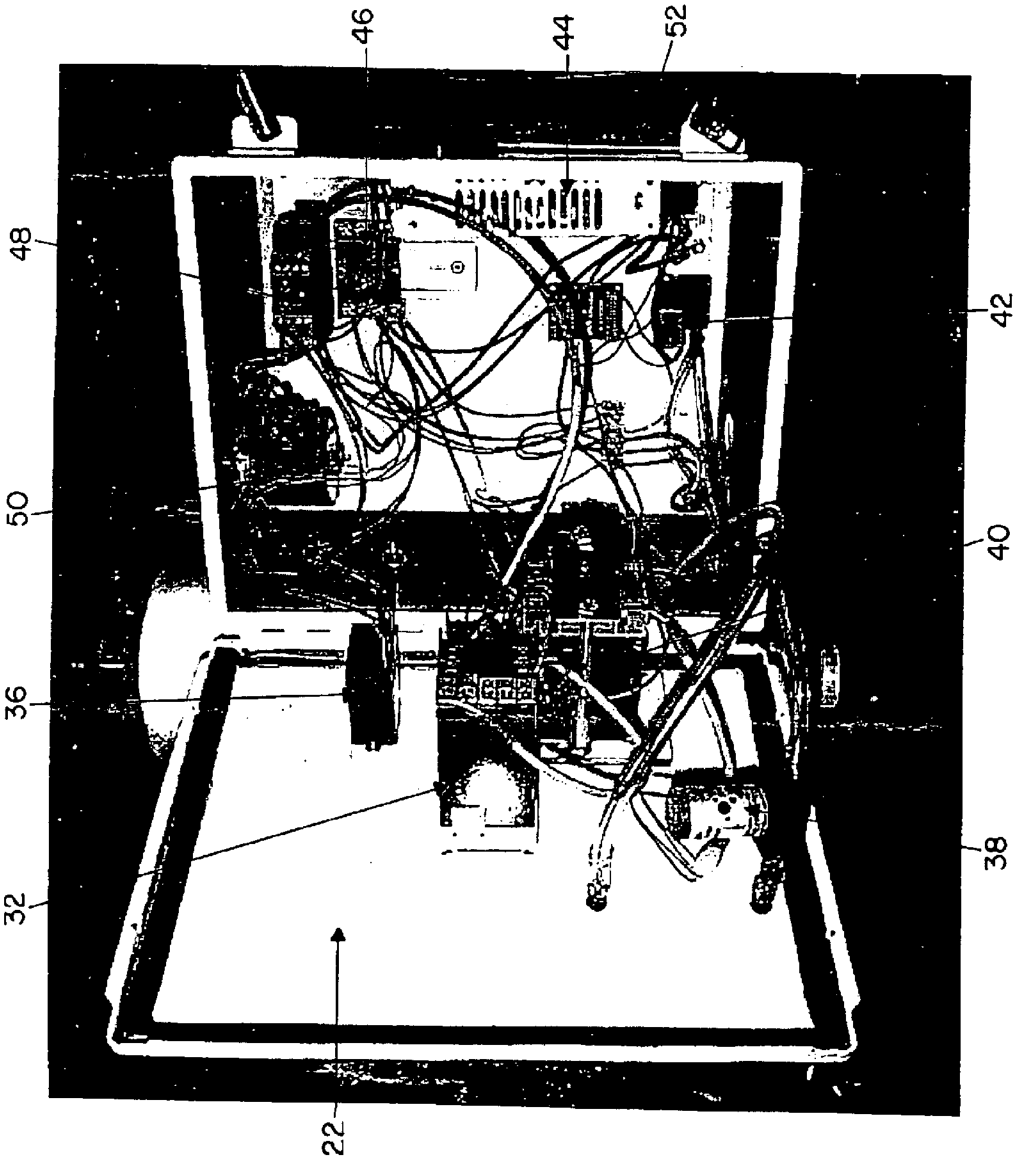
FIG. 3 is a front perspective view of the automatic gas blender of the present invention with the casing door open.

Referring now to FIG. 3, the inside of the casing 22 of the automatic gas blender 10 holds a majority of the electronic and mechanical components comprising the system. Prominent features found inside the automatic gas blender casing are as follows: the manager 32, a specific gas constituent sensor 38, a first signal conditioner 40, a sample pump 42, the power supply 44, relay switch 46, a second signal conditioner 48, and the second gas addition valve 50. A casing filter screen 52 may also be found in the side of metal casing 22.

Figure 4:
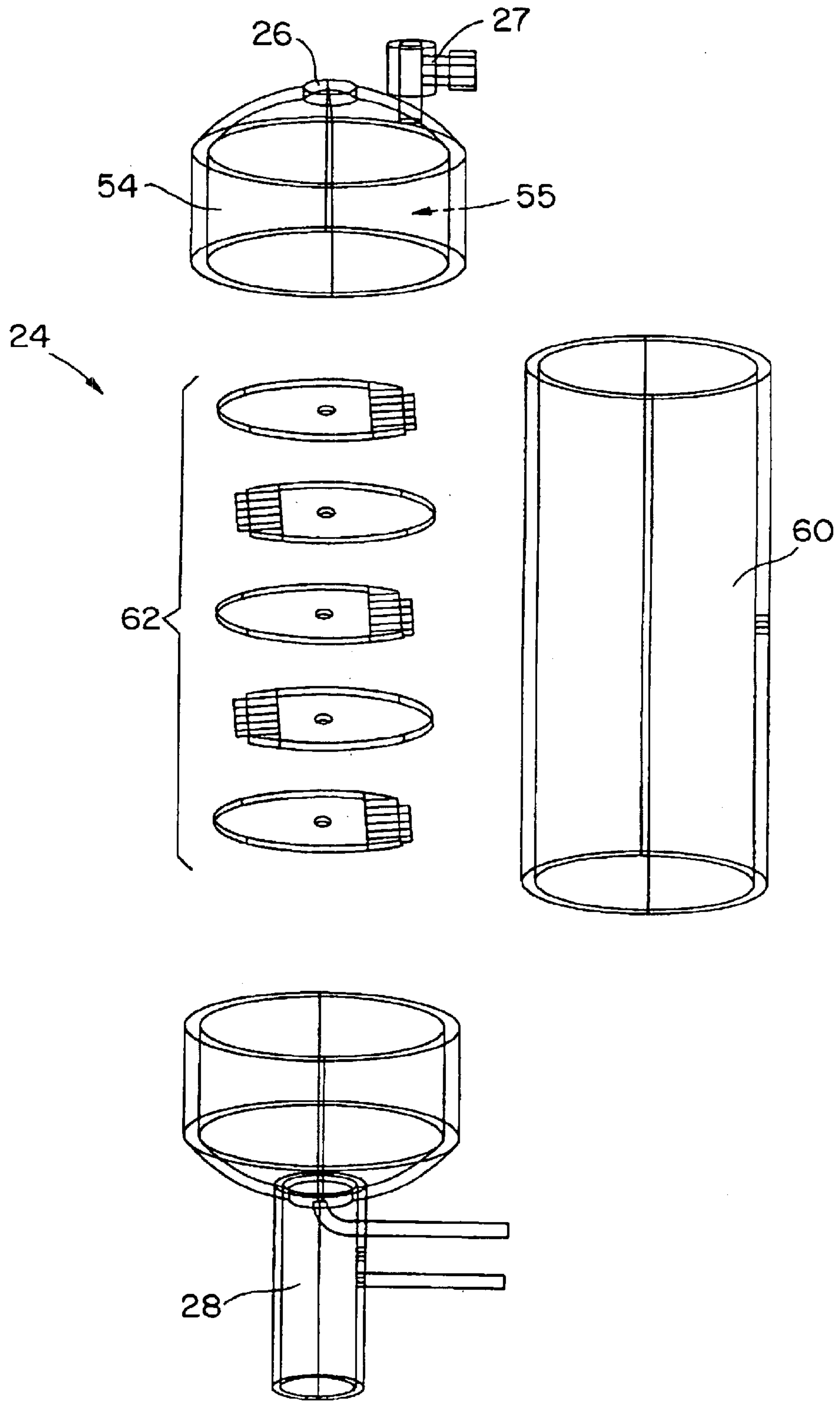
FIG. 4 is an exploded view of the homogenizing chamber of the automatic gas blender of the present invention.

As shown in FIG. 4, the homogenizing chamber 24 of the present invention is shown in more detail. The homogenizing chamber 24 of the present invention consists of a top cap 54 that houses the gas addition area 55 and in which further includes first gas source inlet 26 and second gas source inlet 27. The homogenizing chamber 24 further includes a series of baffled devices 62 and an outer skin 60 that surrounds the baffled devices. The baffled devices 62 may be in press fit relationship with the outer skin 60. Towards the bottom of the homogenizing chamber 24 is a combined gas exit 28 wherein the homogenized gas will exit the chamber.

Figure 5:
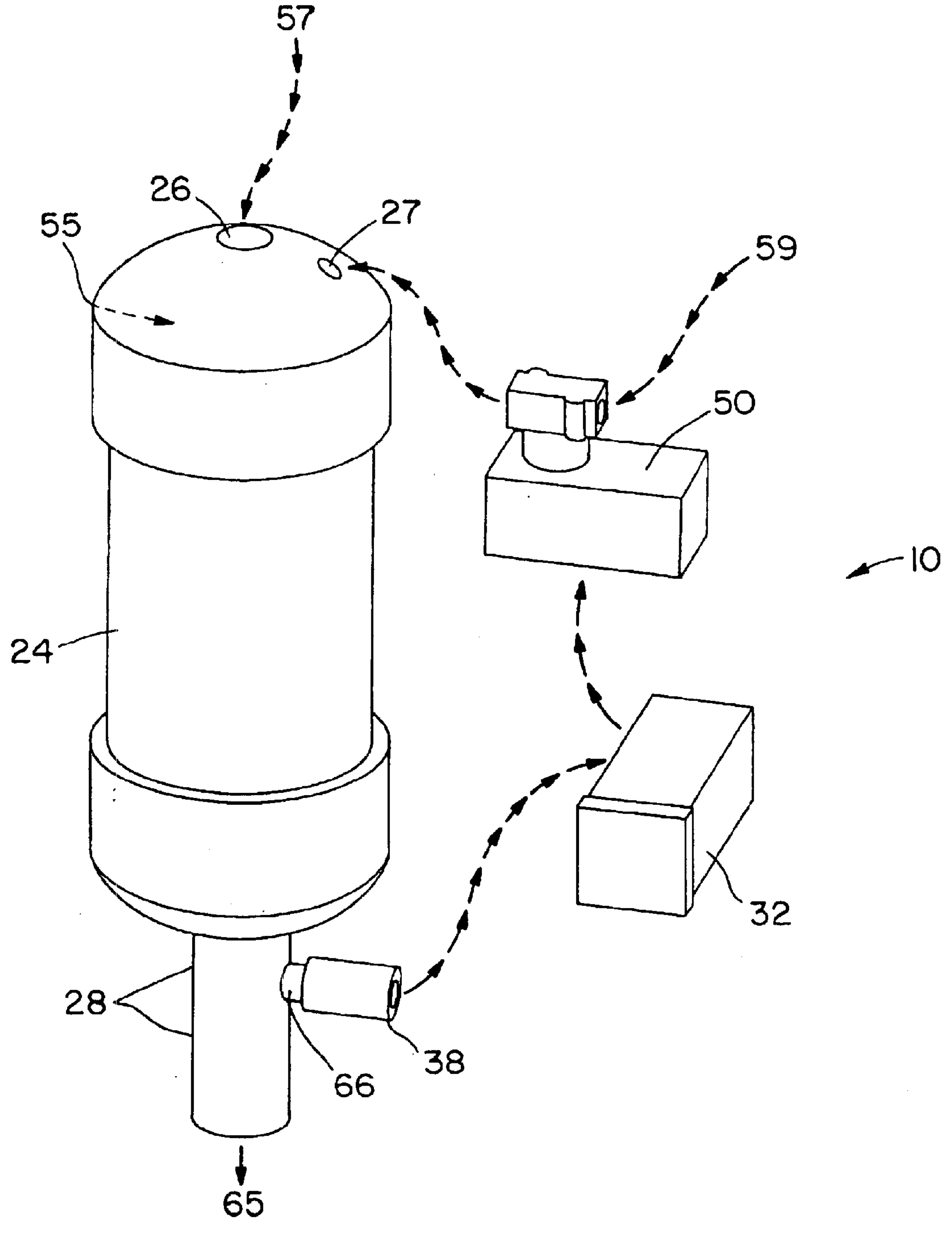
FIG. 5 is a schematic view of the basic system of the automatic gas blender of the present invention.

Referring now to FIG. 5, the operation of the automatic gas blender 10 of the present invention will be described in more detail. A first gas source 57, such as ambient air in a preferred embodiment for the production of Nitrox gas mixture, will enter the gas addition area 55 through the first gas source inlet 26. A second gas source 59, such as oxygen, will enter the gas addition area 55 through a second gas source inlet 27 after passing through a second gas addition valve 50. Once the two gases are added to the gas addition area 55, the gases will then enter the homogenizing chamber 24 where a series of baffled devices 62 create turbulent flow along the length of the homogenizing chamber 24 thus causing the two gases to mix completely. Once the mixed gas reaches the combined gas exit 28, a gas sample is pulled from the combined gas sample point 66. A specific gas constituent sensor 38 is installed so that the specific gas-sensing element of the specific gas constituent gas sensor 38 is in direct contact with the combined gas that is pulled at the combined gas sample point 66.

Figure 6:
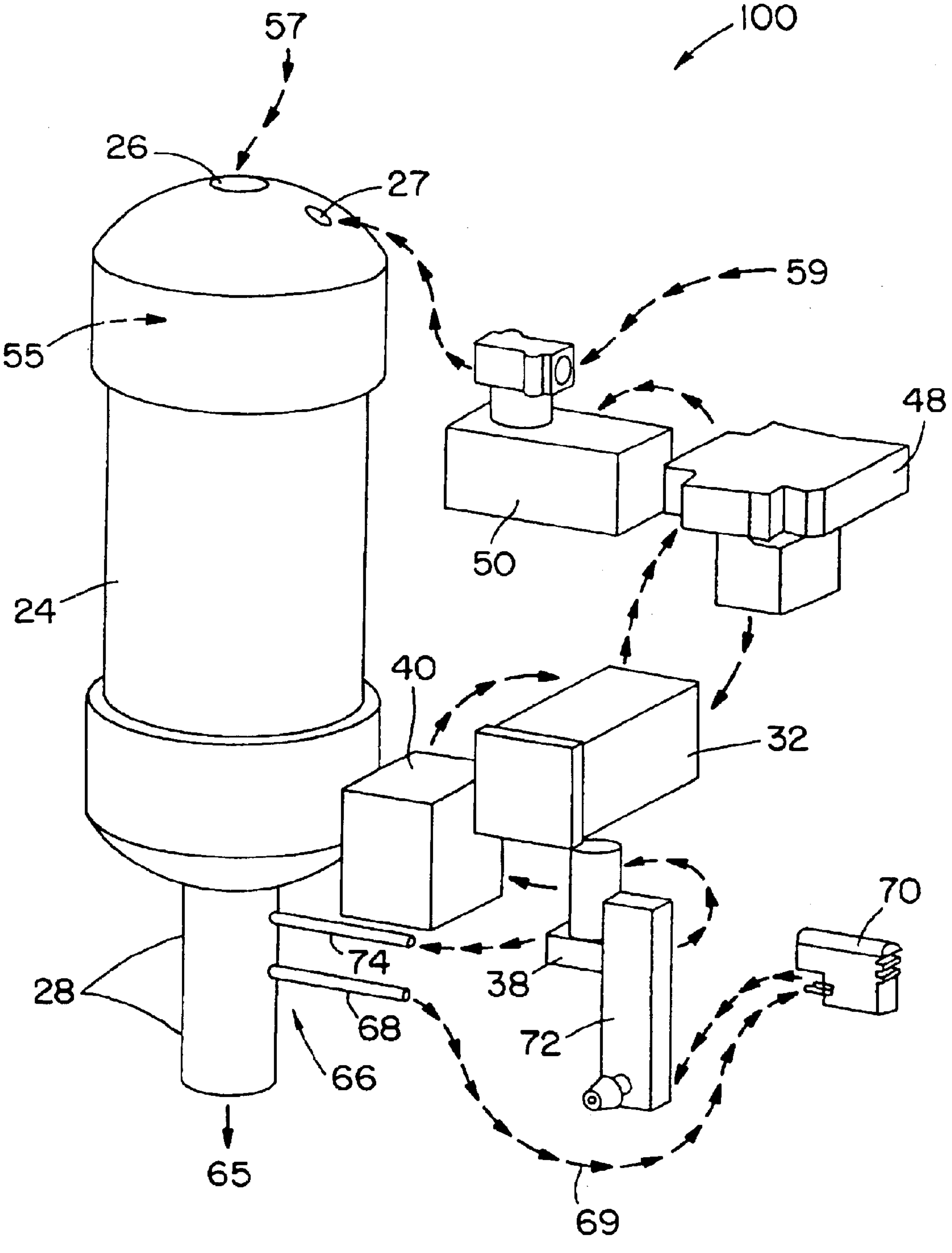
FIG. 6 is a schematic view of the enhanced system of the automatic gas blender of the present invention.

A second embodiment of automatic gas blender 100 is shown in FIG. 6 wherein the combined gas sample point 66 may consist of a gas sample collector 68 that pulls a sample of the combined gas 69 through the use of a pumping mechanism 70 and a flow meter regulator 72 that pulls the gas sample and runs it through the specific gas constituent sensor 38. In this enhanced system, once the data from the gas sample is read, the collected gas may be returned to the combined gas exit area 28 through the use of a gas sample return 74.

In the preferred use of automatic gas blenders 10 and 100 for the production of Nitrox gas mixture, the specific gas constituent sensor 38 may measure the percentage of oxygen in the mixed gas (Nitrox mixture of ambient air and oxygen). In an alternate embodiment, such as the production of a Trimix mixture (helium-nitrogen-oxygen), the specific gas constituent sensor 38 will measure the concentration of the components: oxygen, moisture content, temperature, and thermal conductivity of the mixture using four sensors sending their outputs to the manager 32 which will be able to display and control the percentage of each gas present in the mixture.

Once the specific gas constituent sensor 38 has analyzed the gas sample, the sensor produces a signal through a first signal conditioner 40 describing the amount/portion of a specific gas present in the combined gas and this signal is transmitted to the manager 32. The manager 32 is capable of performing several functions that are determined by the requirements of the installed system. The manager 32 will then send a signal through a second signal conditioner 48 instructing the second gas addition valve 50 to open or close depending on the concentration of the second gas needed. The amount of second gas that is now entering the second gas source inlet 27 will vary depending on the opening and closing of the second gas addition valve 50, which is in turn reacting to data sent from the manager 32. Once this higher or lower concentration of the second gas is mixed with the first gas through the homogenizing chamber 24, another sample is taken and the specific gas constituent sensor 38 will send a new signal representing the portion of the specific gas present in the new combined gas. Once the manager 32 receives this signal and compares the amount of the specific gas present with the instructions given by the operator, another signal is sent to the second gas addition valve 50 to maintain or change the amount of the second gas being sent to the gas addition area 55 to create the required formulation.

The sensor process cycle consists of: the specific gas constituent sensor 38 sending information to the manager 32; the manager 32 comparing the amount of the specific gas present with the instructions from the operator; and the manager 32 signaling the second gas addition valve 50 to maintain or change the amount of the second gas sent to the second gas source inlet 58. This cycle is continuous during the time the combined gas is made.

Set-up and operation of the present invention for the preferred use to make Nitrox gas mixture will now be described in detail.

A delivery hose 76 connects the automatic gas blender 10 discharge to the compressor filter air intake for feeding of mixed Nitrox gas to the compressor 16. The recommended hose size for this delivery hose, designed for an air flow rate of 20 cfm, is 1¼" inside diameter and should have a smooth interior surface. Lower airflow rates such as 7.5 cfm or larger airflow rates such as 50 cfm would use proportionally smaller or larger hose sizes, respectively. The discharge pipe from the automatic gas blender is preferably 1¼" pipe made from PVC or similar materials. A hose barb properly sized for the delivery hose is attached to the outer end of the automatic gas blender discharge pipe. The hose barb connects to one end of the delivery hose and the other end of the delivery hose is attached to the compressor filter intake port. If the compressor filter intake port is threaded (usually a pipe thread) then a hose barb may be screwed into the compressor filter intake port and the delivery hose attached to this hose barb. If the compressor intake port is not threaded, then a stretchable plumbing fitting that is tightened using screw-type band clamps will be needed to attach the hose barb.

Next, a connection from the coil circuit of the magnetic starter for the compressor motor to the safety relay connection in the automatic gas blender is made. This connection should be installed in a flexible conduit between the panel where the magnetic starter for the compressor is located and the port provided on the bottom of the casing for the automatic gas blender. The two wires from the coil circuit on the compressor's magnetic starter are connected to tabs inside the automatic gas blender casing. This wire should preferably be 16 or 18 gauge stranded THHN or MTW wire. The automatic gas blender requires 6 amps of 120 VAC 60 Hz power. A surge suppressor to protect the electronic components in the automatic gas blender should be installed between the automatic gas blender and the receptacle used to provide power to the automatic gas blender.

The oxygen pressure-reducing regulator of the automatic gas blender is then connected to the CGA 540 fitting on the oxygen supply container (12 or 14) and installation is then complete.

The first step in operating the automatic gas blender 10 is to check the oxygen supply 12 or 14 to determine if the quantity of oxygen in the oxygen storage container 12 or 14 that is connected to the oxygen regulator of the automatic gas blender is sufficient to make the desired amount of Nitrox. The user will then start the compressor 16 following the compressor manufacturer's routine start-up procedures. The user will then place the power switch 30 on the front panel of the automatic gas blender into the ON position which in turn will initiate the manager 32 to execute a self-start program. The user will then adjust the flow meter 34 on the front panel of the automatic gas blender so that the flow meter ball indicator is centered on the 1.5 line but no lower than the red line, which indicates a flow rate of 1.0 liters per minute (lpm). A flow rate of 1.5 lpm is optimal, however, the automatic gas blender will function reliably with flows as low as 1.0. The user will next check the SV line on the manager display to ensure it is set to "20.0".

The user will then read the values on the temperature and humidity gauge that is located next to the automatic gas blender ambient air intake. These values are then located on the top and left side of the % oxygen offset chart that is provided with the automatic gas blender. The temperature column is followed downward and the humidity column is followed to the right to find the place where the two lines intersect. This number at the point of intersection is the humidity offset value. The user will then adjust the humidity offset on the front panel of the automatic gas blender so that the PV value on the manager 32 display matches the humidity-offset value from the chart. If either the temperature or humidity does not match one of the values on the % oxygen offset chart, then the column or row closest to the value shown on the temperature and humidity gauge are to be chosen.

Next, the user will turn on the oxygen supply valve and adjust the oxygen regulator to a pressure of 20 PSI on the oxygen pressure reducing regulator output pressure gauge. To enter the desired Nitrox mixture concentration, the user will press the index button on the lower edge of the manager display. The user will then press the up or down arrow buttons to raise or lower the number shown on the SV line on the manager display, representing the desired oxygen content for the Nitrox mixture. The user will then press the enter button on the lower edge of the manager to set the value entered. In a preferred embodiment based on Nitrox concentration of between 21% and 40% oxygen, if the user attempts to enter a value greater than "40.0" the manager will not accept this value and the automatic gas blender will fail to operate. The manager is preprogrammed to not accept values greater than "40.0". Once the user has entered the desired Nitrox concentration, the manager will now start controlling the oxygen flow to achieve the SV value entered. When the PV value matches the SV value, the automatic gas blender is making the requested Nitrox percentage. This process may take several minutes to complete. The user will then allow the compressor 16 to run long enough for the desired Nitrox mixture to purge the compressor, the associated plumbing and the filtration before filling storage 20 or diving cylinders 18. Note that usually a tolerance of +/−0.5% is acceptable to start filling storage or diving cylinders. If a closer tolerance is desired, the user will simply wait until the Nitrox mixture within the desired tolerance is discharging.

Once the storage or diving cylinder has been filled with the desired Nitrox mixture, if the user wishes to enter a different Nitrox mixture concentration the user will simply press the index button on the lower edge of the manager display and then press the up or down arrow buttons to raise or lower the value shown on the PV line on the manager display. The user will then press the enter button on the lower edge of the manager display to set the new Nitrox concentration value entered. The manager will then start controlling the oxygen flow to achieve the SV value entered. When the PV value matches the SV value, the automatic gas blender is making the new requested Nitrox percentage. This process may take several minutes to complete, in which the user shall allow enough time for the desired Nitrox mixture to purge the compressor, the associated plumbing, and the filtration before filling storage or diving cylinders with the new Nitrox mixture.

Once the user has completed filling the storage or diving cylinders with the Nitrox mixture, the user may follow the following shutdown procedures in order to secure the system. The user will first change the Nitrox concentration mixture to “20.0” by pressing the index button on the lower edge of the manager display. The user will then press the down arrow button to lower the value on the PV line of the manager display to a value of “20.0”. The manager will now start controlling the oxygen flow to achieve the SV value entered. When the PV value is less than “21.0”, the automatic gas blender has stopped making a Nitrox mixture. This process can take several minutes to complete.

The user will then stop the flow of oxygen from the oxygen storage containers 12 or 14 by turning off the oxygen supply valve on the oxygen storage container. The user will then open the compressor discharge and allow the compressor 16 to run until the compressor, the associated plumbing, and the filtration has been purged of all Nitrox mixture and only ambient air is coming out of the discharge. The compressor discharge valve is usually located either on the fill whip or some other location that will allow the entire system to be either purged or emptied, allowing for purging of the compressor system before filling of tanks with mixed gas or upon system shut-down. The user will then place the power switch 30 on the front of the automatic gas blender into the off position.

The following maintenance instructions should be followed in order for the automatic gas blender to be maintained in a first-rate operating condition.

The inlet air filter 25 is the gray cylinder located on the top of the homogenizing chamber 24. The filter element within the inlet air filter 25 should be changed every 100 hours of operation and in operating environments with normal dust conditions. To change the filter element, the user will remove the wing nut on top of the gray cylinder and remove the outer shell. The filter is located inside this outer shell. The user will then replace the old filter element with a new filter element, replace the outer shell and secure the unit with the wing nut. The filter element to be used is a standard 10 micron absolute filter available at any high-pressure compressor dealer.

The casing 22 of the automatic gas blender 10 contains a casing filter screen 52 on the lower right side that should be cleaned every 100 hours of operation. To clean the casing filter screen 52, use the end of a hose of a house-type vacuum cleaner to suction off any dust or dirt that has accumulated on the screen.

The internal calibrated oxygen sensor assembly 38 of the preferred embodiment must be replaced every two years or 3,000 hours, whichever comes first.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for automatically blending gases in a continuous flow manner, comprising:

(a) an input device for receiving predetermined mixed gas concentration data from the user;

(b) a plurality of variable gas inlet valves operatively connected to the input device which allow a plurality of gas flows to enter a homogenizing chamber in a continuous flow manner for mixing the plurality of gas flows into a mixed gas;

(c) at least one gas sensor operatively associated with the homogenizing chamber for detecting the concentration of one or more components of the mixed gas and generating at least one output signal representative thereof; and (d) a data manager for receiving the at least one output signal and comparing the at least one output signal with the predetermined mixed gas concentration data and in response generating a signal to at least one of the variable gas inlet valves to modify the plurality of gas flows to maintain the predetermined mixed gas concentration in a continuous flow manner.

2.The system of claim 1 further comprising a gas sample collector that pulls a sample of the mixed gas prior to the detecting of the concentration of one or more components by the at least one gas sensor.

3. The system of claim 1 wherein the mixed gas is a mixture of ambient air and oxygen gas.

4. The system of claim 3 wherein the at least one gas sensor measures the percentage of oxygen in the mixed gas.

5. The system of claim 1 wherein the mixed gas is a mixture of helium, oxygen, and/or nitrogen.

6. The system of claim 5 wherein the at least one gas sensor measures the percentage of oxygen, moisture content, temperature, thermal conductivity, and/or other specific gases in the mixed gas.

7. The system of claim 1 wherein the homogenizing chamber further comprises at least one mixing baffle.

8. A method for automatically blending gases in a continuous flow manner, comprising:

(a) providing an input device for receiving predetermined mixed gas concentration data from the user;

(b) providing a plurality of variable gas inlet valves operatively connected to the input device which allow a plurality of gas flows to enter a homogenizing chamber in a continuous flow manner for mixing the plurality of gas flows into a mixed gas;

(c) providing at least one gas sensor operatively associated with the homogenizing chamber for detecting the concentration of one or more components of the mixed gas and generating at least one output signal representative thereof; and (d) providing a data manager for receiving the at least one output signal and comparing the at least one output signal with the predetermined mixed gas concentration data and in response generating a signal to at least one of the variable gas inlet valves to modify the plurality of gas flows to maintain the predetermined mixed gas concentration in a continuous flow manner.

9. The method of claim 8 wherein the mixed gas is a mixture of ambient air and oxygen gas.

10. The method of claim 9 wherein the at least one gas sensor measures the percentage of oxygen in the mixed gas.

11. The method of claim 8 wherein the mixed gas is a mixture of helium, oxygen, and nitrogen gas.

12. The method of claim 11 wherein the at least one gas sensor measures the percentage of oxygen, moisture content, temperature, and thermal conductivity in the mixed gas.

13. A method of producing a precise mixture of oxygen and air in a oxygen and air mixed breathing gas in a continuous flow manner, comprising:

(a) entering a predetermined oxygen content for the oxygen and air mixed breathing gas into an input device;

(b) supplying a fluid stream of ambient air;

(c) supplying a fluid stream of oxygen through a variable oxygen inlet valve;

(d) mixing the air and oxygen streams in a continuous flow manner in a homogenizing chamber to form a mixed breathing gas;

(e) measuring the oxygen concentration of the mixed breathing gas and generating an output signal representative thereof;

(f) receiving the output signal and comparing the output signal with the predetermined oxygen content and generating a signal to the variable oxygen inlet valve to modify the fluid stream of oxygen to maintain the predetermined oxygen content in the mixed breathing gas;

(g) once the predetermined oxygen content is reached, compressing the mixed breathing gas to a high pressure mixed breathing gas; and (h) transferring the mixed breathing gas into high pressure storage tanks.

14. The method of claim 13 wherein the step of entering the predetermined oxygen content provides an oxygen concentration in the mixed breathing gas of between 21% and 40% oxygen.

15. The method of claim 13 wherein the high pressure mixed breathing gas has a pressure of up to 6000 PSI.

16. A system for automatically blending gases, comprising:

(a) an input device for receiving predetermined mixed gas concentration data from the user;

(b) a plurality of gas inlet valves which allow a plurality of gas flows to enter a homogenizing chamber for mixing the plurality of gas flows into a mixed gas;

(c) at least one gas sensor for detecting the concentration of one or more components of the mixed gas and generating at least one output signal representative thereof;

(d) a manager for receiving the at least one output signal and comparing the at least one output signal with the predetermined mixed gas concentration data and in response generating a signal to at least one gas inlet valve to modify the plurality of gas flows to maintain the predetermined mixed gas concentration;

(e) a gas sample collector that pulls a sample of the mixed gas prior to the detecting of the concentration of one or more components by the at least one gas sensor; and (f) a gas sample return that returns the gas sample after the detecting of the concentration of one or more components by the at least one gas sensor.

* * * * *